US011952292B2

(12) United States Patent
Imran et al.

(10) Patent No.: US 11,952,292 B2
(45) Date of Patent: Apr. 9, 2024

(54) PROCESS TO RECYCLE WATER CONDENSATE FROM $CO_2$ OFF GAS STREAM

(71) Applicant: SABIC Global Technologies B.V., Bergen op Zoom (NL)

(72) Inventors: Muhammad Imran, Riyadh (SA); Sreejit Nair, Bangalore (IN); Deepak Sharma, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 710 days.

(21) Appl. No.: 17/055,917

(22) PCT Filed: May 6, 2019

(86) PCT No.: PCT/IB2019/053698
§ 371 (c)(1),
(2) Date: Nov. 16, 2020

(87) PCT Pub. No.: WO2019/220258
PCT Pub. Date: Nov. 21, 2019

(65) Prior Publication Data

US 2021/0206660 A1 Jul. 8, 2021

Related U.S. Application Data

(60) Provisional application No. 62/673,034, filed on May 17, 2018.

(51) Int. Cl.

| | |
|---|---|
| ***C02F 1/28*** | (2023.01) |
| ***B01D 53/00*** | (2006.01) |

(Continued)

(52) U.S. Cl.
CPC ............ *C02F 1/281* (2013.01); *B01D 53/002* (2013.01); *C02F 1/42* (2013.01);
(Continued)

(58) Field of Classification Search
CPC ........ B01D 53/002; C02F 1/281; C02F 1/283; C02F 1/42; C02F 2001/422;
(Continued)

(56) References Cited

U.S. PATENT DOCUMENTS

| | | |
|---|---|---|
| 3,625,886 A | 12/1971 | Mattia et al. |
| 4,162,298 A | 7/1979 | Holladay et al. |

(Continued)

FOREIGN PATENT DOCUMENTS

| | | |
|---|---|---|
| CN | 1508083 A | 6/2004 |
| DE | 4034269 A1 | 6/1991 |
| EP | 2540377 | 1/2013 |

OTHER PUBLICATIONS

International Search Report and Written Opinion from PCT/IB2019/053698 dated Aug. 20, 2019, 8 pages.

*Primary Examiner* — Frank M Lawrence, Jr.
(74) *Attorney, Agent, or Firm* — Norton Rose Fulbright US LLP

(57) ABSTRACT

A method of processing off gas from a chemical plant, where the off gas includes carbon dioxide and water. The processing of the off gas involves separating the off gas into a gas phase and a liquid phase and using one or more ion-exchange resin bed(s) and one or more granular activated carbon bed(s) to separate unwanted organic materials from the liquid phase. Based on this separation, water can be recovered that has less than 10 wt. % of the unwanted organic compounds originally in the liquid phase of the off gas.

20 Claims, 5 Drawing Sheets

(51) Int. Cl.

| | |
|---|---|
| ***C02F 1/42*** | (2023.01) |
| *C02F 101/20* | (2006.01) |
| *C02F 101/32* | (2006.01) |
| *C02F 101/34* | (2006.01) |
| *C02F 101/36* | (2006.01) |
| *C02F 103/18* | (2006.01) |
| *C02F 103/36* | (2006.01) |

(52) U.S. Cl.
CPC .. *C02F 2001/422* (2013.01); *C02F 2001/425* (2013.01); *C02F 2101/203* (2013.01); *C02F 2101/32* (2013.01); *C02F 2101/34* (2013.01); *C02F 2101/36* (2013.01); *C02F 2103/18* (2013.01); *C02F 2103/36* (2013.01)

(58) Field of Classification Search
CPC .......... C02F 2001/425; C02F 2102/203; C02F 2102/32; C02F 2102/34; C02F 2102/36; C02F 2103/18; C02F 2103/36
USPC ....... 210/660, 661, 663, 664, 669, 681, 683, 210/688, 690, 691, 694
See application file for complete search history.

(56) References Cited

U.S. PATENT DOCUMENTS

| | | | | |
|---|---|---|---|---|
| 4,417,449 | A | 11/1983 | Hegarty et al. | |
| 4,481,112 | A | 11/1984 | Hitzel | |
| 4,595,508 | A * | 6/1986 | Wolfe | B01J 39/07 210/669 |
| 6,224,843 | B1 | 5/2001 | Ahmed et al. | |
| 9,132,376 | B2 | 9/2015 | Stallmann | |
| 2009/0214408 | A1 | 8/2009 | Blake et al. | |
| 2011/0180491 | A1* | 7/2011 | Tokoshima | B01D 19/0031 210/762 |
| 2011/0287144 | A1* | 11/2011 | Kambouris | C02F 1/283 423/580.1 |
| 2013/0098104 | A1 | 4/2013 | Ahman et al. | |
| 2016/0251226 | A1 | 9/2016 | Mammadov et al. | |

* cited by examiner

Conductivity and TDS measurement after treatment

UV measurement after the treatment

Conductivity and TDS measurement after comparative experiment

PROCESS TO RECYCLE WATER CONDENSATE FROM $CO_2$ OFF GAS STREAM

CROSS REFERENCE TO RELATED APPLICATIONS

This application is a national phase application under 35 U.S.C. § 371 of International Application No. PCT/IB2019/053698 filed May 6, 2019, which claims priority to U.S. Provisional Patent Application No. 62/673,034 filed May 17, 2018. The entire contents of each of the above-referenced disclosures is specifically incorporated by reference herein without disclaimer.

FIELD OF INVENTION

The present invention generally relates to the handling of off gas (flue gas) from chemical plants. More specifically, the present invention relates to the processing of carbon dioxide off gas streams from organic chemical plants.

BACKGROUND OF THE INVENTION

Carbon dioxide ($CO_2$) off gas from organic chemical plants typically comprises saturated and unsaturated hydrocarbons, aldehydes, organic chlorides, organic acids, glycol, and water. Generally, carbon dioxide off gas, which is saturated with water, is vented into the atmosphere. In some plants, the carbon dioxide off gas is subjected to phase separation, in which water as well as organics such as acids, chlorides, aldehydes, and glycols condense to form a liquid phase. The liquid phase is mainly water. The quality of the water is adversely affected by the organics that are condensed with it. More to the point, the organics negatively affect the water's pH, ultraviolet (UV) transmittance (220 nm, 250 nm, 275 nm, 350 nm), total dissolved solids (TDS), conductivity, etc. and thus can hinder the utilization of the condensed water as process water. Hence, condensing water and other compounds from the carbon dioxide off gas before it is discharged to the atmosphere creates a problem with respect to the use of and disposal of the condensed water, the volume of which can be large.

U.S. Pat. No. 6,224,843 presents one solution to the problem, in which a water vapor stream from carbon dioxide off gas is oxidized to remove contaminants. In some situations, however, such oxidation of hydrocarbons can be energy and capital intensive.

BRIEF SUMMARY OF THE INVENTION

A method has been discovered for recovering water of a certain quality from an off gas from a chemical plant in a manner that is more energy efficient and less capital intensive than conventional methods. The method involves the use of beds of ion-exchange resin to remove organic compounds from a condensed portion of the carbon dioxide off gas. The types of beds and the sequence of beds may be used based on the composition of the condensed portion of the carbon dioxide off gas.

Embodiments of the invention include a method for recovering water from an off gas from a chemical plant, wherein the off gas comprises carbon dioxide, water, and organic compounds. The method includes separating the off gas into a gas phase and a liquid phase and removing at least a portion of iron disposed in the liquid phase and a portion of the organic compounds (e.g., aldehydes, acids, chlorides, etc.) disposed in the liquid phase of the off gas by one or more ion-exchange resin bed(s) and one or more granular activated carbon bed(s). The iron and organic compounds can adversely affect the quality of the water in the liquid phase (e.g., they can affect the water's UV transmittance, pH, TDS, conductivity, etc.) hence the desire to remove them. The method further includes recovering a liquid that primarily comprises water and has less than 10 wt. % of the unwanted organic compounds in the liquid phase of the off gas.

Embodiments of the invention include a method for recovering water from an off gas from a chemical plant, wherein the off gas comprises carbon dioxide, water, and organic compounds. The method includes separating the off gas into a gas phase and a liquid phase and flowing the liquid phase to separation equipment that includes one or more ion-exchange resin bed(s) and one or more granular activated carbon bed(s), arranged in series. The method further includes removing at least a portion of the organic compounds of the liquid phase of the off gas by the one or more ion-exchange resin bed(s) and the one or more granular activated carbon bed(s) and recovering a liquid that comprises primarily water and has less than 10 wt. % of the unwanted organic compounds in the liquid phase of the off gas.

Embodiments of the invention include a method for recovering water from an off gas from a chemical plant, wherein the off gas comprises carbon dioxide, water, and organic compounds that include saturated hydrocarbons, unsaturated hydrocarbons, chlorinated hydrocarbons, organic acids, glycol, and aldehydes. The method includes separating the off gas into a gas phase and a liquid phase and flowing the liquid phase to separation equipment that comprises a cation ion-exchange resin bed, an anion ion-exchange resin bed, and a granular activated carbon bed, arranged in series. The method further includes removing at least a portion of the organic compounds of the liquid phase of the off gas by the separation equipment, and recovering a liquid that primarily comprises water and has (1) less than 10 wt. % of the unwanted organic compounds in the liquid phase of the off gas, and (2) a conductivity of less than 30 μS/cm.

The following includes definitions of various terms and phrases used throughout this specification.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %," "vol. %" or "mol. %" refer to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, include any measurable decrease or complete inhibition to achieve a desired result.

The term "effective," as that term is used in the specification and/or claims, means adequate to accomplish a desired, expected, or intended result.

The use of the words "a" or "an" when used in conjunction with the term "comprising," "including," "containing,"

or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification.

The term "primarily," as that term is used in the specification and/or claims, means greater than any of 50 wt. %, 50 mol. %, and 50 vol. %. For example, "primarily" may include 50.1 wt. % to 100 wt. % and all values and ranges there between, 50.1 mol. % to 100 mol. % and all values and ranges there between, or 50.1 vol. % to 100 vol. % and all values and ranges there between.

The term "unwanted organic compounds," as that term is used in the specification and/or claims, means one or more of: organic acids, aldehydes, esters, organic iron compounds, and organic chlorides.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding, reference is now made to the following descriptions taken in conjunction with the accompanying drawings, in which.

DETAILED DESCRIPTION OF THE INVENTION

A method has been discovered for recovering water of a certain quality from an off gas from a chemical plant in a manner that is more energy efficient and less capital intensive than conventional methods. The method involves the use of beds of ion-exchange resin to remove organic compounds from a condensed portion of the carbon dioxide off gas. The types of beds and the sequence of beds may be used based on the composition of the condensed portion of the carbon dioxide off gas.

Figure 1:
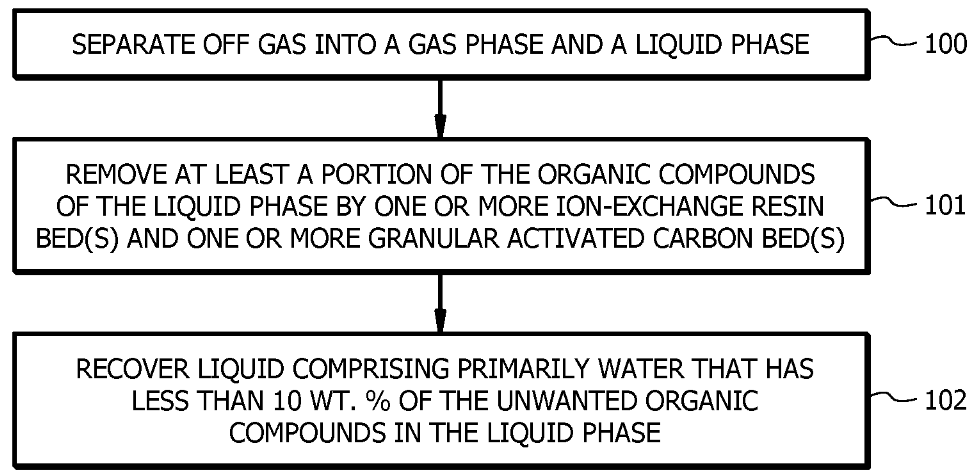
FIG. 1 shows a method of recovering and purification of water from an off gas from a chemical plant, according to embodiments of the invention.

FIG. 1 shows method 10 for recovering water from an off gas of a chemical plant, according to embodiments of the invention. FIGS. 2A-FIG. 2F show systems 20A-20F for recovering water from an off gas of a chemical plant, according to embodiments of the invention. Systems 20A-20F comprise separation equipment. Method 10 may be implemented with any of systems 20A-20F, or combinations thereof.

Method 10, as implemented by systems 20A-20F, may be used for recovering water from off gas 200. Off gas 200 may be from a chemical plant such as an ethylene glycol production plant. In plants such as this, off gas 200 typically comprises carbon dioxide, water, and organic compounds. The organic compounds present in off gas depends on the raw materials used in the chemical plant and the processes carried out in the chemical plant. In some organic chemical plants, the organic compounds present in off gas 200 comprise saturated hydrocarbons, unsaturated hydrocarbons, chlorinated hydrocarbons, organic acids, glycol, aldehydes, and iron. Off gas 200, according to embodiments of the invention, may comprise 45.0 wt. % to 55.0 wt. % water, 45 wt. % to 65 wt. % carbon dioxide, 0.1 wt. % to 0.5 wt. % saturated hydrocarbons, 0.01 wt. % to 0.1 wt. % unsaturated hydrocarbons, 1.0 ppm wt. to 5.0 ppm wt. chlorinated hydrocarbons, 5.0 ppm wt. to 15.0 ppm wt. organic acids, 0.5 wt. % to 1.0 wt. % glycol, 10.0 ppm wt. to 30 ppm wt. aldehydes, and 1.0 ppm wt. to 2.0 ppm wt. iron.

According to embodiments of the invention, method 10 may begin at block 100, which involves separating off gas 200 into gas phase 202 and a liquid phase 203. The separation at block 100 may be carried out by separator 201. Separator 201 may be, for example, a heat exchanger for cooling off gas 200 to a predetermined temperature so that the water and other compounds in off gas 200 condense to form liquid phase 203. Alternatively or additionally, in embodiments of the invention, separator 201 may be a knock-out drum, a cooling water condenser, a chilled water condenser, or combinations thereof for separating off gas 200 into gas phase 202 and liquid phase 203.

In embodiments of the invention, gas phase 202 comprises 7.0 wt. % to 10.0 wt. % water, 92.0 wt. % to 94.0 wt. % carbon dioxide 0.1 wt. % to 0.5 wt. % saturated hydrocarbons, 0.01 wt. % to 0.1 wt. % unsaturated hydrocarbons, 1.0 ppm wt. to 3.0 ppm wt. chlorinated hydrocarbons, and 5.0 ppm wt. to 8.0 ppm wt. aldehydes. According to embodiments of the invention, liquid phase 203 comprises 97.0 wt. % to 99.0 wt. % water, 0.5 wt. % to 0.8 wt. % carbon dioxide, 1.0 ppm wt. to 2.0 ppm wt. chlorinated hydrocarbons, 5.0 ppm wt. to 15.0 ppm wt. organic acids, 0.5 wt. % to 1.0 wt. % glycol, 5.0 ppm wt. to 25.0 ppm wt. aldehydes, 1.0 ppm wt. to 2.0 ppm wt. iron.

According to embodiments of the invention, method 10 may further include, at block 101, removing at least a portion of the organic compounds of liquid phase 203 by one or more ion-exchange resin bed(s) and one or more granular activated carbon bed(s). The organic compounds removed from the liquid phase may include any of aldehydes, acids, chlorides, or combinations thereof. Additionally or alternatively, iron may be removed from liquid phase 203 at block 101. The separation of liquid phase 203 at block 101 may be carried out by any of systems 20A-20F or combinations thereof. As shown in FIGS. 2A-2F, the separation at block 101 can include flowing liquid phase 203 to a further separation section of any of systems 20A-20F or combinations thereof, which each comprise cation ion-exchange resin bed 204, anion ion-exchange resin bed 206, and granular activated carbon bed 208, arranged in series.

According to embodiments of the invention, cation ion-exchange resin bed 204, anion ion-exchange resin bed 206, and granular activated carbon bed 208 may be arranged in series in any sequence to provide any order of flow of liquid phase 203 through the beds. According to embodiments of the invention, such sequence of cation ion-exchange resin bed 204, anion ion-exchange resin bed 206, and granular activated carbon bed 208 in series may depend on the composition of liquid phase 203 and/or the composition of effluent 209 that is desired.

Figure 2A:
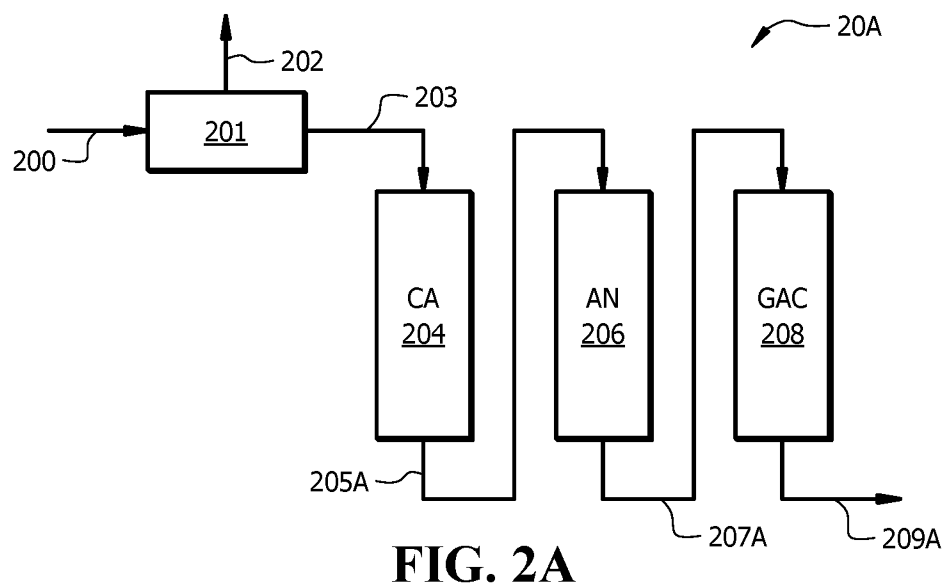
FIGS. 2A-2F show systems for recovering water from an off gas from a chemical plant, according to embodiments of the invention.

Based on the configuration shown in FIG. 2A, according to embodiments of the invention, method 10 includes flowing liquid phase 203 to cation ion-exchange resin bed 204 so that liquid phase 203 contacts cation ion-exchange resin bed 204, which results in cation ion-exchange resin bed 204 removing Fe, Ag, K, Na, V, and cation of organic acids, and thereby producing effluent 205A. Method 10 may also include flowing effluent 205A from cation ion-exchange resin bed 204 to anion ion-exchange resin bed 206 so that effluent 205A contacts anion ion-exchange resin bed 206, which results in anion ion-exchange resin bed 206 removing chlorides, carbonates, sulphates, and anion of organic acids, and thereby producing effluent 207A. Method 20 may further include flowing effluent 207A from anion ion-exchange resin bed 206 to granular activated carbon bed 208 so that effluent 207A contacts granular activated carbon bed 208, which results in granular activated carbon bed 208 removing aldehydes and thereby producing effluent 209A. The granular activated carbon is a good adsorbent and adsorbs some quantity of glycol resulting in TOC (total organic carbon) reduction in effluent 209A. The arrangement in FIG. 2A is particularly effective in improving water UVs, reducing TDS, improving pH, and reducing conductivity and aldehyde contents. Any organic species resulting from reactions in cation and anion exchangers will have a tendency to adsorb on a granular activated carbon bed. The treated water has good potential to be utilized as cycle water in a glycol chemical plant or as a treated process water in other chemical plants where high UVs are required.

Figure 2B:
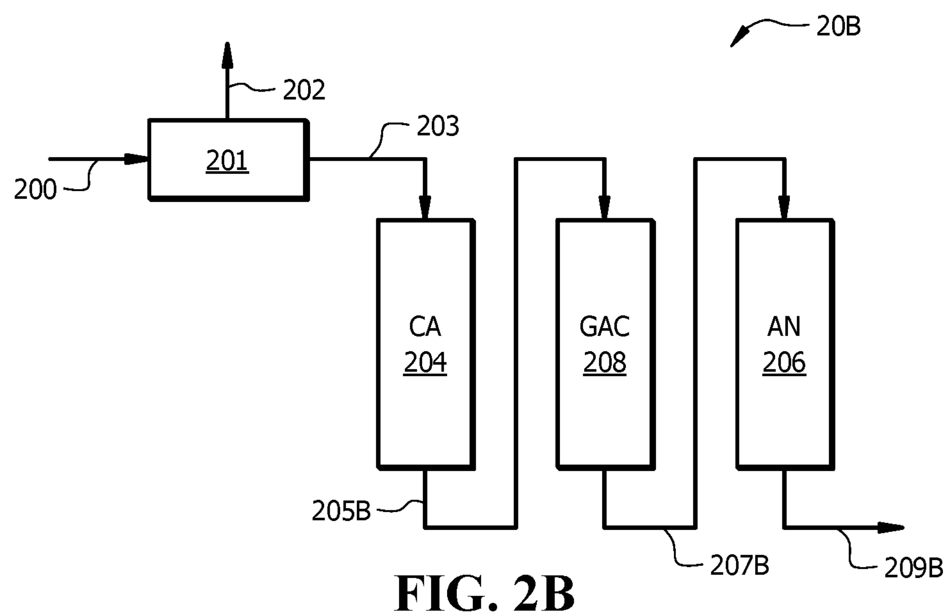

Based on the configuration shown in FIG. 2B, according to embodiments of the invention, method 10 includes flowing liquid phase 203 to cation ion-exchange resin bed 204 so that liquid phase 203 contacts cation ion-exchange resin bed 204, which results in cation ion-exchange resin bed 204 removing Fe, Ag, K, Na, V, and cation of organic acids, and thereby producing effluent 205B. Method 10 may also include flowing effluent 205B from cation ion-exchange resin bed 204 to granular activated carbon bed 208 so that effluent 205B contacts granular activated carbon bed 208, which results in granular activated carbon bed 208 removing aldehydes and thereby producing effluent 207B. The granular activated carbon is a good adsorbent and adsorbs some quantity of glycol resulting in TOC (total organic carbon) reduction in effluent 207B. Method 20 may further include flowing effluent 207B granular activated carbon bed 208 to anion ion-exchange resin bed 206 so that effluent 207B contacts anion ion-exchange resin bed 206, which results in anion ion-exchange resin bed 206 removing chlorides, carbonates, sulphates, and anion of organic acids, and thereby producing effluent 209B. The arrangement in FIG. 2B is particularly effective in improving water UVs, reducing TDS, improving pH, and reducing aldehyde contents. The treated water has good potential to be utilized as process water in chemical plants where high water UVs are required.

Figure 2C:
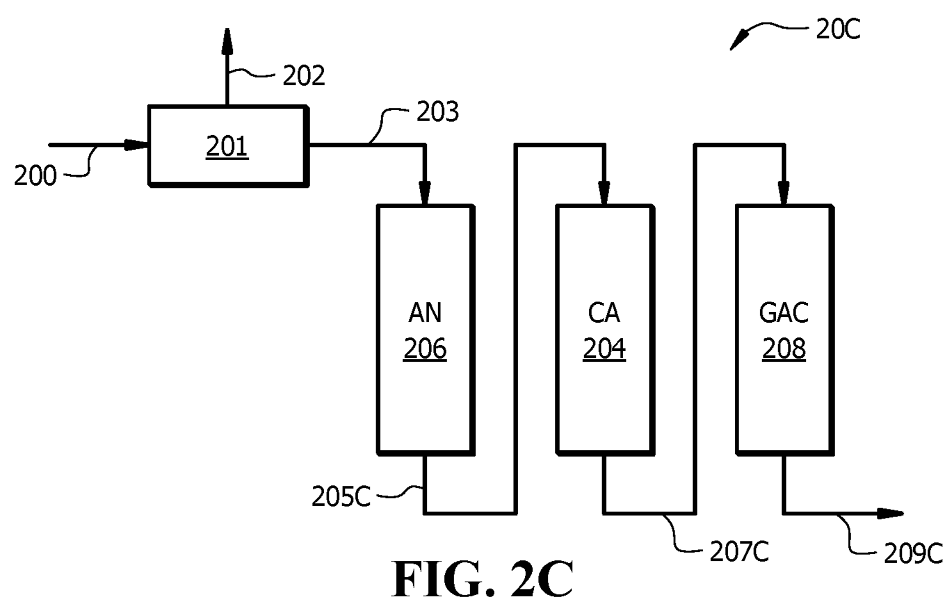

Based on the configuration shown in FIG. 2C, according to embodiments of the invention, method 10 includes flowing liquid phase 203 to anion ion-exchange resin bed 206 so that liquid phase 203 contacts anion ion-exchange resin bed 206, which results in anion ion-exchange resin bed 206 removing chlorides, carbonates, sulphates, and anion of organic acids, and thereby producing effluent 205C. Method 10 may also include flowing effluent 205C from anion ion-exchange resin bed 206 to cation ion-exchange resin bed 204 so that effluent 205C contacts cation ion-exchange resin bed 204, which results in cation ion-exchange resin bed 204 removing Fe, Ag, K, Na, V, and cation of organic acids, and thereby producing effluent 207C. Method 20 may further include flowing effluent 207C from cation ion-exchange resin bed 204 to granular activated carbon bed 208 so that effluent 207C contacts granular activated carbon bed 208, which results in granular activated carbon bed 208 removing aldehydes and thereby producing effluent 209C. The granular activated carbon is a good adsorbent and adsorbs some quantity of glycol resulting in TOC (total organic carbon) reduction in effluent 209C. The arrangement in FIG. 2C is particularly effective in improving water UVs, reducing TDS, improving pH, reducing conductivity and aldehyde contents. The treated water has good potential to be utilized as process water in chemical plants where high water UVs are required.

Figure 2D:
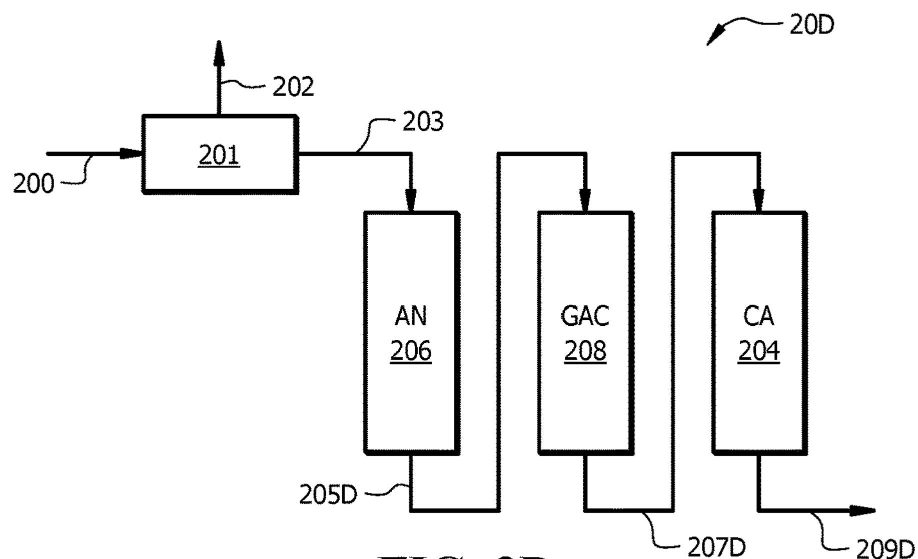

Based on the configuration shown in FIG. 2D, according to embodiments of the invention, method 10 includes flowing liquid phase 203 to anion ion-exchange resin bed 206 so that liquid phase 203 contacts anion ion-exchange resin bed 206, which results in anion ion-exchange resin bed 206 removing chlorides, carbonates, sulphates, and anion of organic acids, and thereby producing effluent 205D. Method 10 may also include flowing effluent 205D from anion ion-exchange resin bed 206 to granular activated carbon bed 208 so that effluent 205D contacts granular activated carbon bed 208, which results in granular activated carbon bed 208 removing aldehydes and thereby producing effluent 207D. The granular activated carbon is a good adsorbent and adsorbs some quantity of glycol/other organic compounds resulting in TOC (total organic carbon) reduction in effluent 207D. Method 20 may further include flowing effluent 207D from granular activated carbon bed 208 to cation ion-exchange resin bed 204 so that effluent 207D contacts cation ion-exchange resin bed 204, which results in cation ion-exchange resin bed 204 removing Fe, Ag, K, Na, V, and cation of organic acids, and thereby producing effluent 209D. Any leaching of cations from the cation bed would affect conductivity. The arrangement in FIG. 2D is particularly effective in improving water UVs, reducing TDS, improving pH, and reducing aldehyde contents.

Figure 2E:
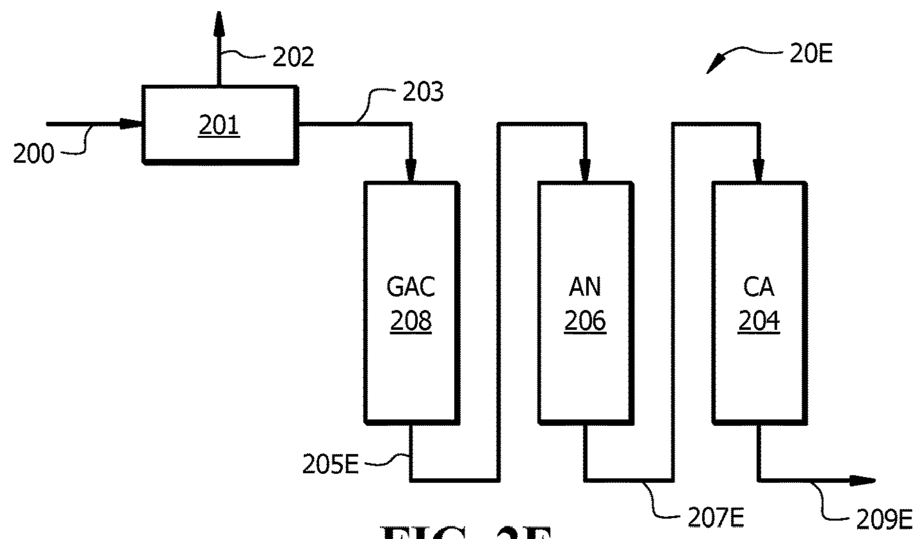

Based on the configuration shown in FIG. 2E, according to embodiments of the invention, method 10 includes flowing liquid phase 203 to granular activated carbon bed 208 so that liquid phase 203 contacts granular activated carbon bed 208, which results in granular activated carbon bed 208 removing aldehydes and other organics (glycol, esters) and thereby producing effluent 205E. Method 10 may also include flowing effluent 205E from granular activated carbon bed 208 to anion ion-exchange resin bed 206 so that effluent 205E contacts anion ion-exchange resin bed 206, which results in anion ion-exchange resin bed 206 removing chlorides, carbonates, sulphates, and anion of organic acids, and thereby producing effluent 207E. Method 20 may further include flowing effluent 207E from anion ion-exchange resin bed 206 to cation ion-exchange resin bed 204 so that effluent 207E contacts cation ion-exchange resin bed 204, which results in cation ion-exchange resin bed 204 removing Fe, Ag, K, Na, V, and cation of organic acids, and thereby producing effluent 209E. Any leaching from the cation and anion beds would affect conductivity and pH. The arrangement in FIG. 2E is particularly effective in reducing TDS, improving water UVs, and reducing aldehyde contents. The treated water has good potential to be utilized as process water in chemical plants where high water UVs are required.

Figure 2F:
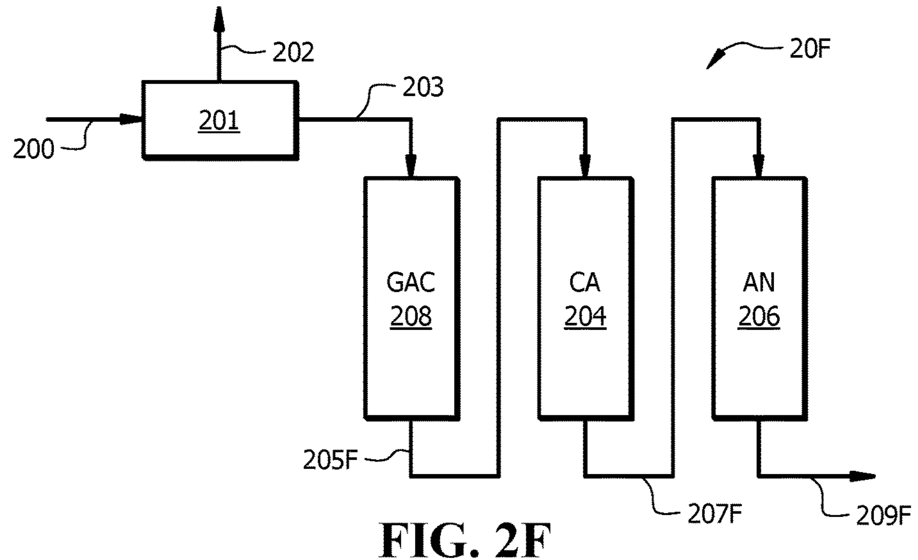

Based on the configuration shown in FIG. 2F, according to embodiments of the invention, method 10 includes flowing liquid phase 203 to granular activated carbon bed 208 so that liquid phase 203 contacts granular activated carbon bed 208, which results in granular activated carbon bed 208 removing aldehydes and other organics (glycol, esters) and thereby producing effluent 205F. Method 10 may also include flowing effluent 205F from granular activated carbon bed 208 to cation ion-exchange resin bed 204 so that effluent 205F contacts cation ion-exchange resin bed 204, which results in cation ion-exchange resin bed 204 removing Fe, Ag, K, Na, V, and cation of organic acids, and thereby producing effluent 207F. Method 20 may further include flowing effluent 207F from cation ion-exchange resin bed 204 to anion ion-exchange resin bed 206 so that effluent 207F contacts anion ion-exchange resin bed 206, which results in anion ion-exchange resin bed 206 removing chlorides, carbonates, sulphates, and anion of organic acids, and thereby producing effluent 209F. Any leaching from the cation and anion beds would affect conductivity and pH. The arrangement in FIG. 2F is particularly effective in reducing TDS, improving water UVs, and reducing aldehyde contents. The treated water has good potential to be utilized as process water in chemical plants where high water UVs are required.

According to embodiments of the invention, the separation at block 101, as described with respect to any of systems 20A-20F, as shown in FIGS. 2A-2F, may include operating cation ion-exchange resin bed 204, anion ion-exchange resin bed 206, and granular activated carbon bed 208 at a temperature in a range of 59° F. to 100° F.

According to embodiments of the invention, the separation at block 101, as described with respect to any of systems 20A-20F, as shown in FIGS. 2A-2F, may include operating at a fluid flow rate in a range of 2 to 4 BV/hr through any of cation ion-exchange resin bed 204, anion ion-exchange resin bed 206, and granular activated carbon bed 208.

Method 10, according to embodiments of the invention, may further include, at block 102, recovering any of liquids 209A-209F from systems 20A-20F depending on which of systems 20A-20F is used. In embodiments of the invention, liquid 209A-209F comprises primarily water that has less than 10 wt. % of the unwanted organic compounds in liquid phase 203. In embodiments of the invention, liquid 209A-209F has a conductivity of less than 30 μS/cm. According to embodiments of the invention, liquid 209A-209F may be recycled to lean cycle water or lean absorbent in a glycol chemical plant and as a process water in other chemical plants where high water UVs are required.

In embodiments of the invention the chemical plant that produces off gas 200 includes an ethylene glycol production plant. Alternatively or additionally, the chemical plant can be any other chemical or petrochemical plant that has saturated carbon dioxide off gas containing organic impurities like acids, aldehydes, etc. The saturated off gas from these types of plants can be condensed and the condensate treated by the systems and methods described herein. The treated water can be recycled with high UV transmittances, low pH, low TDS, and low conductivity.

Although embodiments of the present invention have been described with reference to blocks of FIG. 1, it should be appreciated that operation of the present invention is not limited to the particular blocks and/or the particular order of the blocks illustrated in FIG. 1. Accordingly, embodiments of the invention may provide functionality as described herein using various blocks in a sequence different than that of FIG. 1.

As part of the disclosure of the present invention, specific examples are included below. The examples are for illustrative purposes only and are not intended to limit the invention. Those of ordinary skill in the art will readily recognize parameters that can be changed or modified to yield essentially the same results.

EXAMPLES

Example 1

(Treatment of $CO_2$ off gas by beds configured as in system 20A)
SIMULATED FEED COMPOSTION FOR CO2 WATER CONDENSATE

| ANALYSIS PARAMETER | I-SF-LL LOWER LIMIT PPM | I-SF-HL UPER LIMIT PPM |
|---|---|---|
| FORMIC ACID | 5 | 10 |
| ACETIC ACID | 5 | 20 |
| ALDEHYDES(ACETALDEHYDE) (Formal + acetaldehyde + glycoldehyde) | 15 | 105 |
| MEG | 6000 | 12000 |
| DEG | 100 | 2000 |
| Fe acetate/Sulphate (to match TDS) | 5 | 100 |
| ethylene Chloride | 5 | 100 |
| UV Measurements | | |
| 220 nm | 57.6 | 35.3 |
| 250 nm | 64 | 43.1 |
| 275 nm | 68.3 | 29.8 |
| 350 nm | 80.6 | 46.1 |

Figure 3:
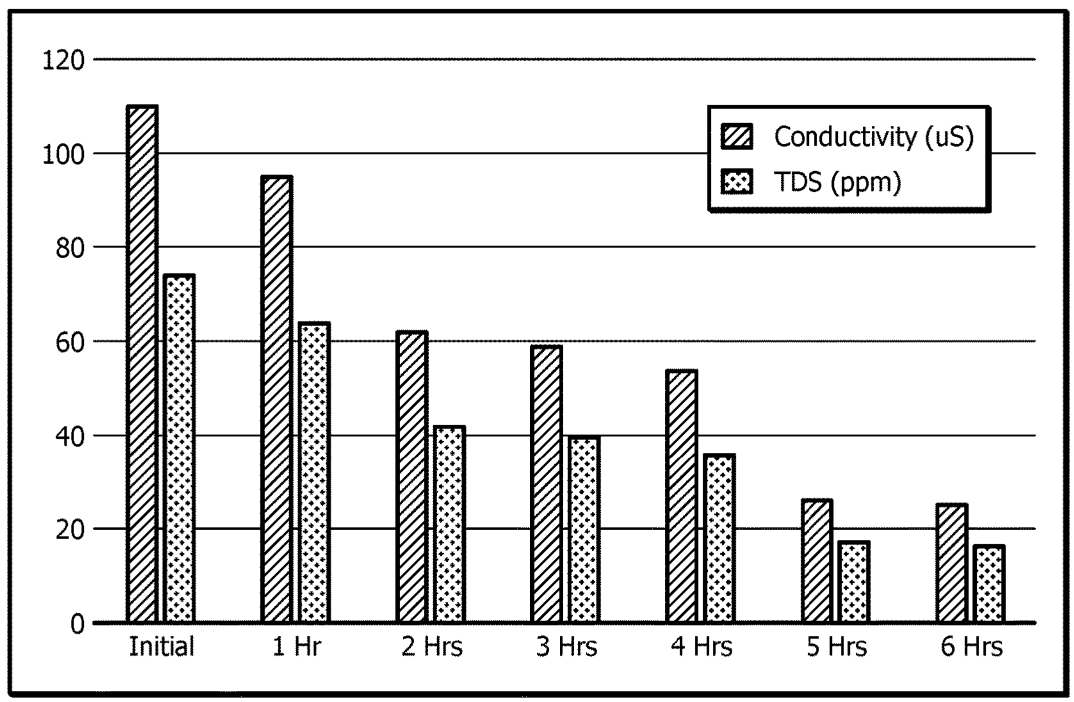
FIG. 3 shows a graph of results related to the use of a system, as shown in FIG. 2A, for recovering water from an off gas from a chemical plant, according to embodiments of the invention.
Figure 4:
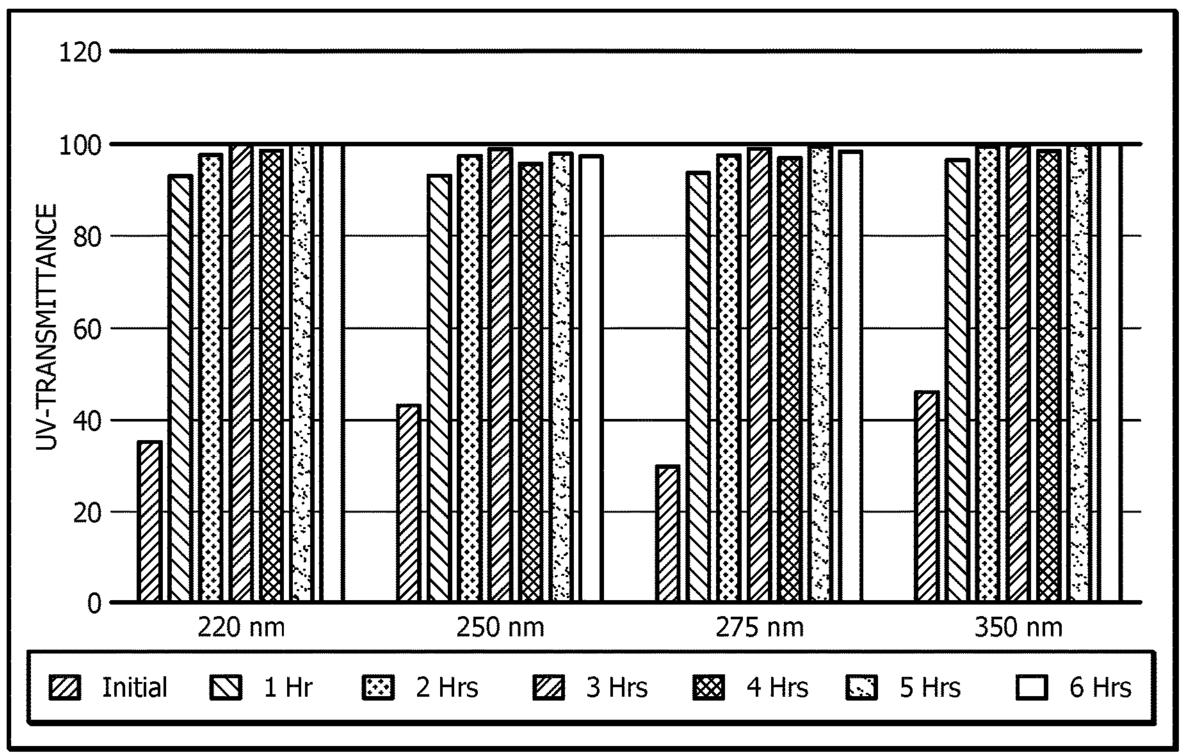
FIG. 4 shows a graph of results related to the use of a system, as shown in FIG. 2A, for recovering water from an off gas from a chemical plant, according to embodiments of the invention.

The sequence of beds used in this experiment is cation (1st), anion (2nd), and activated carbon (3rd) as in system 20A, shown in FIG. 2A. The experiment was carried out using a simulated feed (shown in Table 1). The feed was fed through the sequence of beds (as arranged in system 20A) and the effluent from the last bed was tested. The results are summarized in FIG. 3 and FIG. 4.

Example 2

Treatment of $CO_2$ Off Gas by Beds Configured as in System 20B

Figure 5:
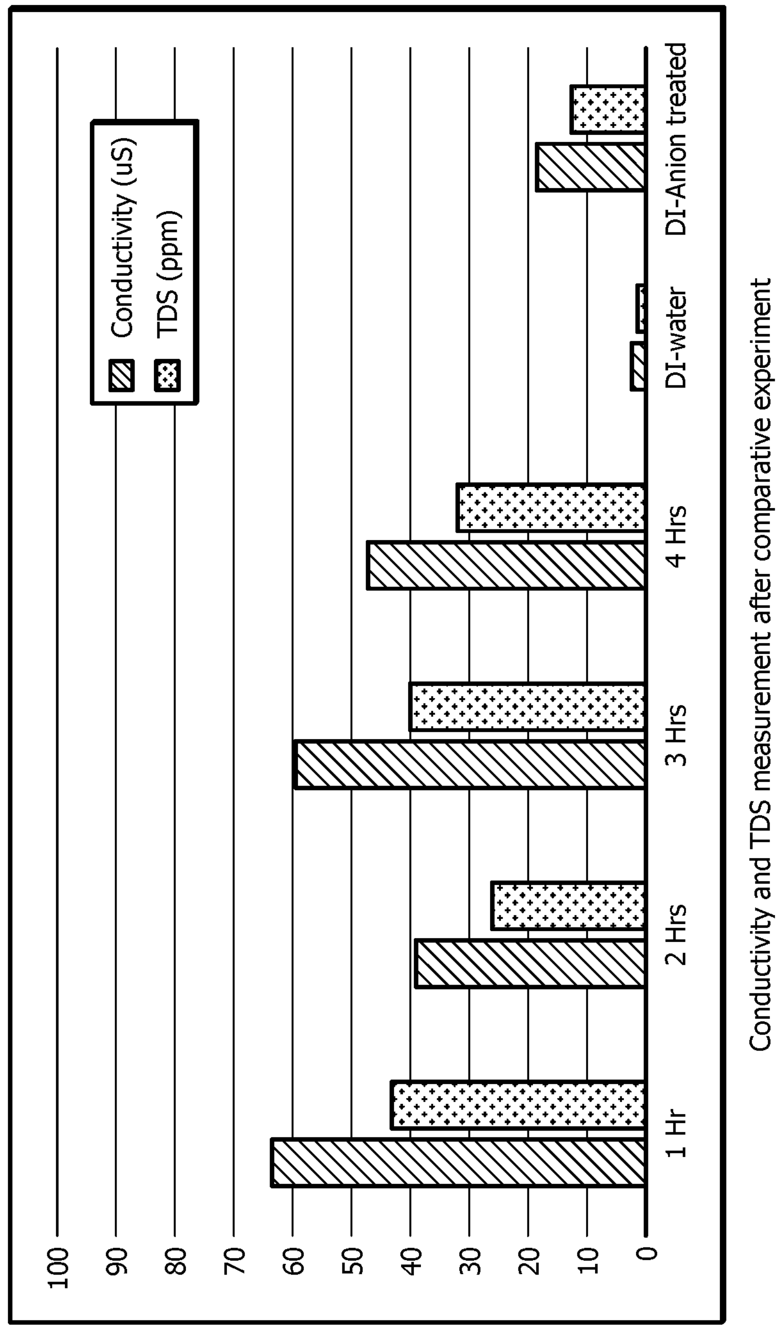
FIG. 5 shows a graph of results related to the use of a system, as shown in FIG. 2B, for recovering water from an off gas from a chemical plant, according to embodiments of the invention.

The sequence of beds used in this experiment is cation (1st), activated carbon (2nd) and polishing with anion bed (3rd) as in system 20B, shown in FIG. 2B. The experiment was carried out using a simulated feed (shown in Table 1). The feed was fed through the sequence of beds (as arranged in system 20B) and the effluent from the last bed was tested. The results are summarized in FIG. 5.

In the context of the present invention, embodiments 1-18 are described. Embodiment 1 is a method for recovering water from an off gas from a chemical plant, the off gas containing carbon dioxide, water, and organic compounds. The method includes separating the off gas into a gas phase and a liquid phase. The method also includes removing at least a portion of the organic compounds of the liquid phase of the off gas by one or more ion-exchange resin bed(s) and one or more granular activated carbon bed(s). In addition, the method includes recovering a liquid that comprises primarily water and less than 10 wt. % of the unwanted organic compounds in the liquid phase of the off gas. Embodiment 2 is the method of embodiment 1, wherein the off gas includes saturated hydrocarbons, unsaturated hydrocarbons, chlorinated hydrocarbons, organic acids, glycol, aldehydes, and iron. Embodiment 3 is the method of either of embodiments 1 or 2, wherein the off gas contains 45.0 wt. % to 55.0 wt. % water, 45 wt. % to 65 wt. % carbon dioxide, 0.1 wt. % to 0.5 wt. % saturated hydrocarbons, 0.01 wt. % to 0.1 wt. % unsaturated hydrocarbons, 1.0 ppm wt. to 5.0 ppm wt. chlorinated hydrocarbons, 5.0 ppm wt. to 15.0 ppm wt. organic acids, 0.5 wt. % to 1.0 wt. % glycol, 10.0 ppm wt. to 30 ppm wt., and aldehydes, 1.0 ppm wt. to 2.0 ppm wt. iron. Embodiment 4 is the method of any of embodiments 1 to 3, wherein the organic compounds removed from the liquid phase include aldehydes, acids, and chlorides. Embodiment 5 is the embodiment of any of embodiments 1 to 4, wherein iron is removed from the liquid phase of the off gas. Embodiment 6 is the method of any of embodiments 1 to 5, wherein the recovered liquid has a conductivity of less than 30 μS/cm. Embodiment 7 is the method of any of embodiments 1 to 6, further including flowing the liquid phase to separation equipment that includes a cation ion-exchange resin bed, an anion ion-exchange resin bed, and the granular activated carbon bed, arranged in series, wherein the separation equipment performs the removing. Embodiment 8 is the method of embodiment 7, wherein the liquid phase of the off gas is flowed to the cation ion-exchange resin bed, effluent from the cation ion-exchange resin bed is flowed to the anion ion-exchange resin bed, and effluent from the anion ion-exchange resin bed is flowed to the granular activated carbon bed. Embodiment 9 is the method of embodiment 7, wherein the liquid phase of the off gas is flowed to the cation ion-exchange resin bed, effluent from the cation ion-exchange resin bed is flowed to the granular activated carbon bed, and effluent from the granular activated carbon bed is flowed to the anion ion-exchange resin bed. Embodiment 10 is the method of embodiment 7, wherein the liquid phase of the off gas is flowed to the anion ion-exchange resin bed, effluent from the anion ion-exchange resin bed is flowed to the cation ion-exchange resin bed, and effluent from the cation ion-exchange resin bed is flowed to the granular activated carbon bed. Embodiment 11 is the method of embodiment 7, wherein the liquid phase of the off gas is flowed to the anion ion-exchange resin bed, effluent from the anion ion-exchange resin bed is flowed to an activated carbon bed, and effluent from the activated carbon bed is flowed to the cation ion-exchange resin bed. Embodiment 12 is the method of embodiment 7, wherein the liquid phase of the off gas is flowed to the granular activated carbon bed, effluent from the granular activated carbon bed is flowed to the anion ion-exchange resin bed, and effluent from the anion ion-exchange resin bed is flowed to the cation ion-exchange resin bed. Embodiment 13 is the method of embodiment 7, wherein the liquid phase of the off gas is flowed to the granular activated carbon bed, effluent from the granular activated carbon bed is flowed to the cation ion-exchange resin bed, and effluent from the cation ion-exchange resin bed is flowed to the anion ion-exchange resin bed. Embodiment 14 is the method of any of embodiments 1 to 13, wherein the one or more ion-exchange resin bed(s) and one or more granular activated carbon bed(s) are operated in a temperature range of 59° F. to 100° F. Embodiment 15 is the method of any of embodiments 1 to 14, wherein flow rate through the one or more ion-exchange resin bed(s) and one or more granular activated carbon bed(s) is in a range of 2 to 4 BV/hr. Embodiment 16 is the method of any of embodiments 1 to 15, wherein the gas phase contains 7.0 wt. % to 10.0 wt. % water, 92.0 wt. % to 94.0 wt. % carbon dioxide 0.1 wt. % to 0.5 wt. % saturated hydrocarbons, 0.01 wt. % to 0.1 wt. % unsaturated hydrocarbons, 1.0 ppm wt. to 3.0 ppm wt. chlorinated hydrocarbons, 5.0 ppm wt. to 8.0 ppm wt. aldehydes. Embodiment 17 is the method of any of embodiments 1 to 16, wherein the liquid phase contains 97.0 wt. % to 99.0 wt. % water, 0.5 wt. % to 0.8 wt. % carbon dioxide, 1.0 ppm wt. to 2.0 ppm wt. chlorinated hydrocarbons, 5.0 ppm wt. to 15.0 ppm wt. organic acids, 0.5 wt. % to 1.0 wt. % glycol, 5.0 ppm wt. to 25.0 ppm wt. aldehydes, 1.0 ppm wt. to 2.0 ppm wt. iron. Embodiment 18 is the method of any of embodiments 1 to 17, wherein the chemical plant includes an ethylene glycol production plant.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method for recovering water from an off gas from a chemical plant, the off gas comprising carbon dioxide, water, and organic compounds, the method comprising:

separating the off gas into a gas phase and a liquid phase;

removing at least a portion of the organic compounds of the liquid phase of the off gas by one or more ion-exchange resin bed(s) and one or more granular activated carbon bed(s); and recovering a liquid that comprises primarily water and less than 10 wt. % of the unwanted organic compounds in the liquid phase of the off gas;

wherein the off gas comprises saturated hydrocarbons, unsaturated hydrocarbons, chlorinated hydrocarbons, organic acids, glycol, aldehydes, and iron; and wherein the recovered liquid has a conductivity of less than 30 μS/cm.

2. The method of claim 1, wherein the organic compounds removed from the liquid phase comprise chlorides.

3. The method of claim 1, wherein the off gas comprises 45.0 wt. % to 55.0 wt. % water, 45 wt. % to 65 wt. % carbon dioxide, 0.1 wt. % to 0.5 wt. % saturated hydrocarbons, 0.01 wt. % to 0.1 wt. % unsaturated hydrocarbons, 1.0 ppm wt.

to 5.0 ppm wt. chlorinated hydrocarbons, 5.0 ppm wt. to 15.0 ppm wt. organic acids, 0.5 wt. % to 1.0 wt. % glycol, 10.0 ppm wt. to 30 ppm wt. aldehydes, and 1.0 ppm wt. to 2.0 ppm wt. iron.

4. The method of claim 1, wherein the organic compounds removed from the liquid phase comprise aldehydes, acids, and chlorides.

5. The method of claim 1, wherein iron is removed from the liquid phase of the off gas.

6. The method of claim 1, wherein the organic compounds removed from the liquid phase comprise acids and chlorides.

7. The method of claim 1, further comprising:

flowing the liquid phase to separation equipment that comprises a cation ion-exchange resin bed, an anion ion-exchange resin bed, and the granular activated carbon bed, arranged in series, wherein the separation equipment performs the removing.

8. The method of claim 7, wherein the liquid phase of the off gas is flowed to the cation ion-exchange resin bed, effluent from the cation ion-exchange resin bed is flowed to the anion ion-exchange resin bed, and effluent from the anion ion-exchange resin bed is flowed to the granular activated carbon bed.

9. The method of claim 7, wherein the liquid phase of the off gas is flowed to the cation ion-exchange resin bed, effluent from the cation ion-exchange resin bed is flowed to the granular activated carbon bed, and effluent from the granular activated carbon bed is flowed to the anion ion-exchange resin bed.

10. The method of claim 7, wherein the liquid phase of the off gas is flowed to the anion ion-exchange resin bed, effluent from the anion ion-exchange resin bed is flowed to the cation ion-exchange resin bed, and effluent from the cation ion-exchange resin bed is flowed to the granular activated carbon bed.

11. The method of claim 7, wherein the liquid phase of the off gas is flowed to the anion ion-exchange resin bed, effluent from the anion ion-exchange resin bed is flowed to an activated carbon bed, and effluent from the activated carbon bed is flowed to the cation ion-exchange resin bed.

12. The method of claim 7, wherein the liquid phase of the off gas is flowed to the granular activated carbon bed, effluent from the granular activated carbon bed is flowed to the anion ion-exchange resin bed, and effluent from the anion ion-exchange resin bed is flowed to the cation ion-exchange resin bed.

13. The method of claim 7, wherein the liquid phase of the off gas is flowed to the granular activated carbon bed, effluent from the granular activated carbon bed is flowed to the cation ion-exchange resin bed, and effluent from the cation ion-exchange resin bed is flowed to the anion ion-exchange resin bed.

14. The method of claim 1, wherein the one or more ion-exchange resin bed(s) and one or more granular activated carbon bed(s) are operated in a temperature range of 59° F. to 100° F.

15. The method of claim 1, wherein flow rate through the one or more ion-exchange resin bed(s) and one or more granular activated carbon bed(s) is in a range of 2 to 4 BV/hr.

16. The method of claim 1, wherein the gas phase comprises 7.0 wt. % to 10.0 wt. % water, 92.0 wt. % to 94.0 wt. % carbon dioxide 0.1 wt. % to 0.5 wt. % saturated hydrocarbons, 0.01 wt. % to 0.1 wt. % unsaturated hydrocarbons, 1.0 ppm wt. to 3.0 ppm wt. chlorinated hydrocarbons, and 5.0 ppm wt. to 8.0 ppm wt. aldehydes.

17. The method of claim 1, wherein the liquid phase comprises 97.0 wt. % to 99.0 wt. % water, 0.5 wt. % to 0.8 wt. % carbon dioxide, 1.0 ppm wt. to 2.0 ppm wt. chlorinated hydrocarbons, 5.0 ppm wt. to 15.0 ppm wt. organic acids, 0.5 wt. % to 1.0 wt. % glycol, 5.0 ppm wt. to 25.0 ppm wt. aldehydes, and 1.0 ppm wt. to 2.0 ppm wt. iron.

18. The method of claim 1, wherein the chemical plant comprises an ethylene glycol production plant.

19. The method of claim 3, wherein the chemical plant comprises an ethylene glycol production plant.

20. The method of claim 4, wherein the chemical plant comprises an ethylene glycol production plant.

* * * * *